(12) United States Patent
Arnold, Sr.

(10) Patent No.: US 6,486,774 B1
(45) Date of Patent: Nov. 26, 2002

(54) VEHICULAR DECELERATION WARNING SYSTEM

(76) Inventor: Alphonso Arnold, Sr., 4408 Hamilton Dr., Woodbridge, VA (US) 22193

( * ) Notice: Subject to any disclaimer, the term of this patent is extended or adjusted under 35 U.S.C. 154(b) by 0 days.

(21) Appl. No.: 09/810,045

(22) Filed: Mar. 16, 2001

(51) Int. Cl.$^7$ .................................................. B60Q 1/50
(52) U.S. Cl. ...................... 340/467; 340/468; 340/471; 340/479; 180/282; 200/61.89
(58) Field of Search ................................ 340/467, 464, 340/479, 466, 471, 473, 476; 180/271, 282; 200/61.89

(56) References Cited

U.S. PATENT DOCUMENTS

| | | | |
|---|---|---|---|
| 3,912,892 A | * 10/1975 | Morehouse | 200/61.89 |
| 4,034,338 A | * 7/1977 | Bevilacqua | 340/467 |
| 4,730,181 A | 3/1988 | Perkins | 340/464 |
| 4,788,526 A | * 11/1988 | Eckstein et al. | 340/467 |
| 4,894,640 A | 1/1990 | Beasley et al. | 340/464 |
| 4,916,431 A | 4/1990 | Gearey | 340/479 |
| 4,924,207 A | 5/1990 | Larisey | 340/467 |
| D342,912 S | 1/1994 | Richey | D10/104 |
| 5,463,370 A | * 10/1995 | Ishikawa et al. | 340/439 |
| 5,589,817 A | * 12/1996 | Furness | 340/467 |
| 5,606,310 A | * 2/1997 | Egger et al. | 340/479 |
| 5,663,706 A | * 9/1997 | Francis | 340/464 |
| 5,796,333 A | 8/1998 | Niemann | 340/467 |
| 5,892,434 A | * 4/1999 | Carlson et al. | 340/438 |

* cited by examiner

*Primary Examiner*—Jeffery Hofsass
*Assistant Examiner*—Davetta W. Goins

(57) ABSTRACT

A vehicular deceleration warning system for providing a warning that impending deceleration and braking may occur. The vehicular deceleration warning system includes an accelerator pedal pressure sensor for detecting removal of a driver's foot pressure from the accelerator pedal. The sensor comprises a housing. The housing includes a bottom wall with a substantially planar bottom for securely removably mounting on a front surface of the pedal. The housing also includes a top wall with a substantially planar top surface for pressing a foot against. A first plate is mounted in the housing adjacent to the top wall of the housing. A second plate is mounted in the housing adjacent to the bottom wall of the housing. A biasing means is provided for biasing the second plate away from the first plate. A signaling means is provided for visually warning the following vehicle of the impending deceleration of the first vehicle. The signaling means is designed to illuminate when activated. The signaling means is mountable in a window of the first vehicle. In one embodiment, the sensor includes a switch mounted on the plates, which activates the signaling means when a driver removes pressure from the accelerator pedal and causes the switch to close.

1 Claim, 5 Drawing Sheets

VEHICULAR DECELERATION WARNING SYSTEM

BACKGROUND OF THE INVENTION

1. Field of the Invention

The present invention relates to motor vehicle safety systems and more particularly pertains to a new vehicular deceleration warning system for providing a warning that impending deceleration and braking may occur.

2. Description of the Prior Art

The use of motor vehicle safety systems is known in the prior art. More specifically, motor vehicle safety systems heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,916,431; U.S. Pat. No. 4,730,181; U.S. Pat. No. 4,894,640; U.S. Pat. No. 4,924,207; U.S. Pat. No. 5,796,333; and U.S. Pat. No. Des. 342,912.

While these devices fulfill their respective, particular objectives and requirements, the aforementioned patents do not disclose a new vehicular deceleration warning system. The inventive device includes an accelerator pedal pressure sensor for detecting removal of a driver's foot pressure from the accelerator pedal. The sensor comprises a housing. The housing includes a bottom wall with a substantially planar bottom for securely removably mounting on a front surface of the pedal. The housing also includes a top wall with a substantially planar top surface for pressing a foot against. A first plate is mounted in the housing adjacent to the top wall of the housing. A second plate is mounted in the housing adjacent to the bottom wall of the housing. A biasing means is provided for biasing the second plate away from the first plate. A signaling means is provided for visually warning the following vehicle of the impending deceleration of the first vehicle. The signaling means is adapted to illuminate when activated. The signaling means is mountable in a window of the first vehicle. In one embodiment, the sensor includes a switch mounted on the plates that activates the signaling means when a driver removes pressure from the accelerator pedal and causes the switch to close.

In these respects, the vehicular deceleration warning system according to the present invention substantially departs from the conventional concepts and designs of the prior art, and in so doing provides an apparatus primarily developed for the purpose of providing a warning that impending deceleration and braking may occur.

SUMMARY OF THE INVENTION

In view of the foregoing disadvantages inherent in the known types of motor vehicle safety systems now present in the prior art, the present invention provides a new vehicular deceleration warning system construction wherein the same can be utilized for providing a warning that impending deceleration and braking may occur.

The general purpose of the present invention, which will be described subsequently in greater detail, is to provide a new vehicular deceleration warning system apparatus and method which has many of the advantages of the motor vehicle safety systems mentioned heretofore and many novel features that result in a new vehicular deceleration warning system which is not anticipated, rendered obvious, suggested, or even implied by any of the prior art motor vehicle safety systems, either alone or in any combination thereof.

To attain this, the present invention generally comprises an accelerator pedal pressure sensor for detecting removal of a driver's foot pressure from the accelerator pedal. The sensor comprises a housing. The housing includes a bottom wall with a substantially planar bottom for securely removably mounting on a front surface of the pedal. The housing also includes a top wall with a substantially planar top surface for pressing a foot against. A first plate is mounted in the housing adjacent to the top wall of the housing. A second plate is mounted in the housing adjacent to the bottom wall of the housing. A biasing means is provided for biasing the second plate away from the first plate. A signaling means is provided for visually warning the following vehicle of the impending deceleration of the first vehicle. The signaling means is adapted to illuminate when activated. The signaling means is mountable in a window of the first vehicle. In one embodiment, the sensor includes a switch mounted on the plates that activates the signaling means when a driver removes pressure from the accelerator pedal and causes the switch to close.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new vehicular deceleration warning system apparatus and method which has many of the advantages of the motor vehicle safety systems mentioned heretofore and many novel features that result in a new vehicular deceleration warning system which is not anticipated, rendered obvious, suggested, or even implied by any of the prior art motor vehicle safety systems, either alone or in any combination thereof.

It is another object of the present invention to provide a new vehicular deceleration warning system which may be easily and efficiently manufactured and marketed.

It is a further object of the present invention to provide a new vehicular deceleration warning system which is of a durable and reliable construction.

An even further object of the present invention is to provide a new vehicular deceleration warning system which is susceptible of a low cost of manufacture with regard to both materials and labor, and which accordingly is then susceptible of low prices of sale to the consuming public, thereby making such vehicular deceleration warning system economically available to the buying public.

Still yet another object of the present invention is to provide a new vehicular deceleration warning system which provides in the apparatuses and methods of the prior art some of the advantages thereof, while simultaneously overcoming some of the disadvantages normally associated therewith.

Still another object of the present invention is to provide a new vehicular deceleration warning system for providing a warning that impending deceleration and braking may occur.

Yet another object of the present invention is to provide a new vehicular deceleration warning system which includes an accelerator pedal pressure sensor for detecting removal of a driver's foot pressure from the accelerator pedal. The sensor comprises a housing. The housing includes a bottom wall with a substantially planar bottom for securely removably mounting on a front surface of the pedal. The housing also includes a top wall with a substantially planar top surface for pressing a foot against. A first plate is mounted in the housing adjacent to the top wall of the housing. A second plate is mounted in the housing adjacent to the bottom wall of the housing. A biasing means is provided for biasing the second plate away from the first plate. A signaling means is provided for visually warning the following vehicle of the impending deceleration of the first vehicle. The signaling means is adapted to illuminate when activated. The signaling means is mountable in a window of the first vehicle. In one embodiment, the sensor includes a switch mounted on the plates that activates the signaling means when a driver removes pressure from the accelerator pedal and causes the switch to close.

Still yet another object of the present invention is to provide a new vehicular deceleration warning system that would reduce the potential of injury due to an accident caused because of a decelerating vehicle slowing suddenly without the application of the brakes.

Even still another object of the present invention is to provide a new vehicular deceleration warning system that permits following drivers to anticipate the possible application of the brakes, and provides drivers with enough advance time to plan a maneuver around a decelerating vehicle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
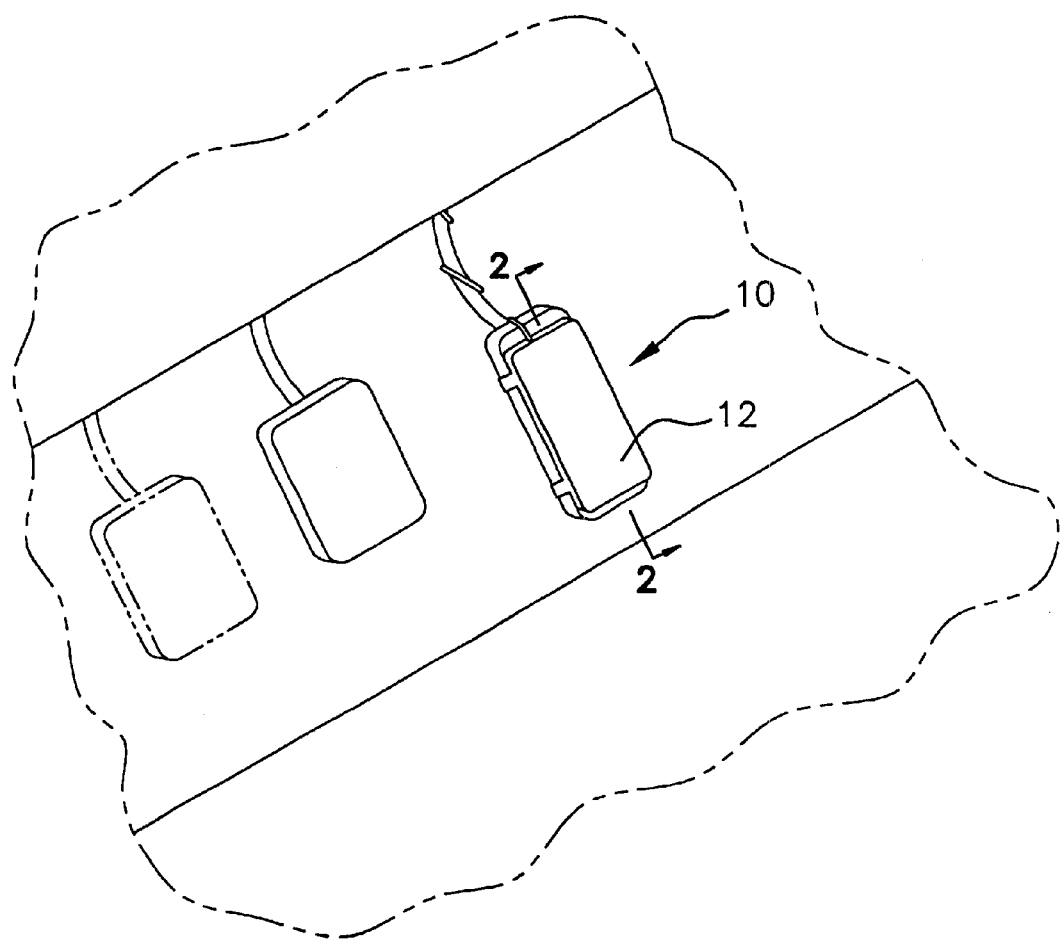
FIG. 1 is a schematic perspective view illustrating a new vehicular deceleration warning system according to the present invention showing a accelerator pedal sensor removably mounted on an accelerator pedal.

With reference now to the drawings, and in particular to FIGS. 1 through 7 thereof, a new vehicular deceleration warning system embodying the principles and concepts of the present invention and generally designated by the reference numeral 10 will be described.

As best illustrated in FIGS. 1 through 7, the vehicular deceleration warning system 10 generally comprises an accelerator pedal pressure sensor 12 for detecting removal of a driver's foot pressure from the accelerator pedal. The sensor comprises a housing 14 that includes a top wall 15 and a bottom wall 16. A peripheral wall 17 extends between and is coupled to the top and bottom walls 15 and 16. A lower surface 19 of the bottom wall 16 is mountable on the front surface of the accelerator pedal. The housing 14 may comprise a generally flexible material such as, for example, a rubber material.

Figure 2:
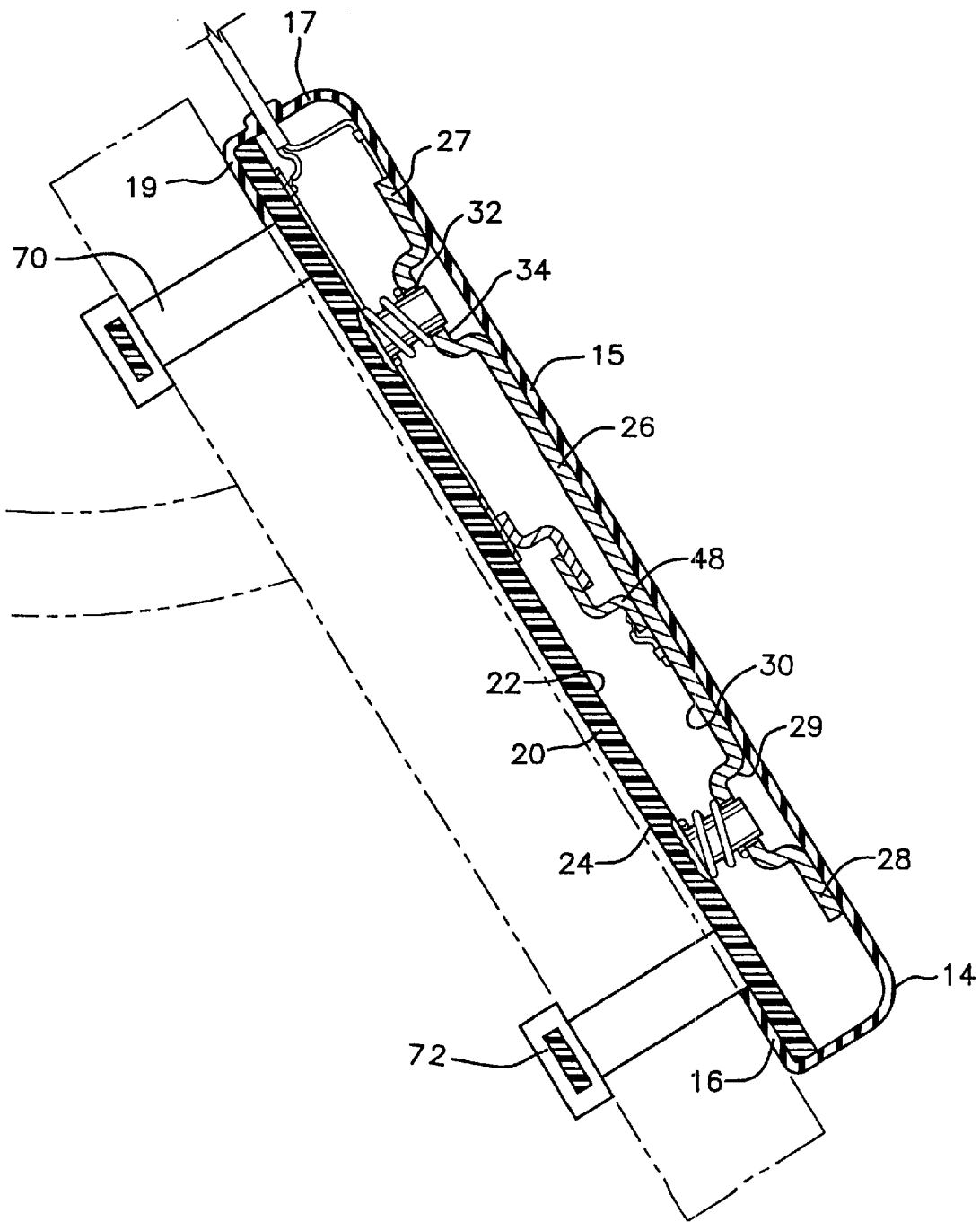
FIG. 2 is a schematic cross-sectional view of the present invention taken along line 2—2 of FIG. 1 and particularly showing a pair of electrical contacts mounted in housing of the accelerator pedal pressure sensor.
Figure 3:
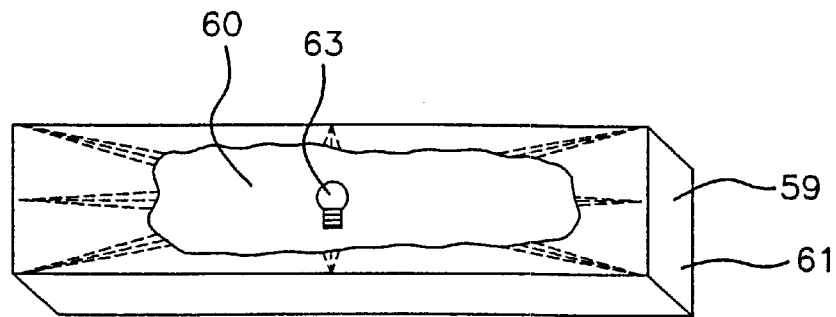
FIG. 3 is a schematic cut-away view of the present invention showing signaling means having a light removably mounted in a casing.
Figure 4:
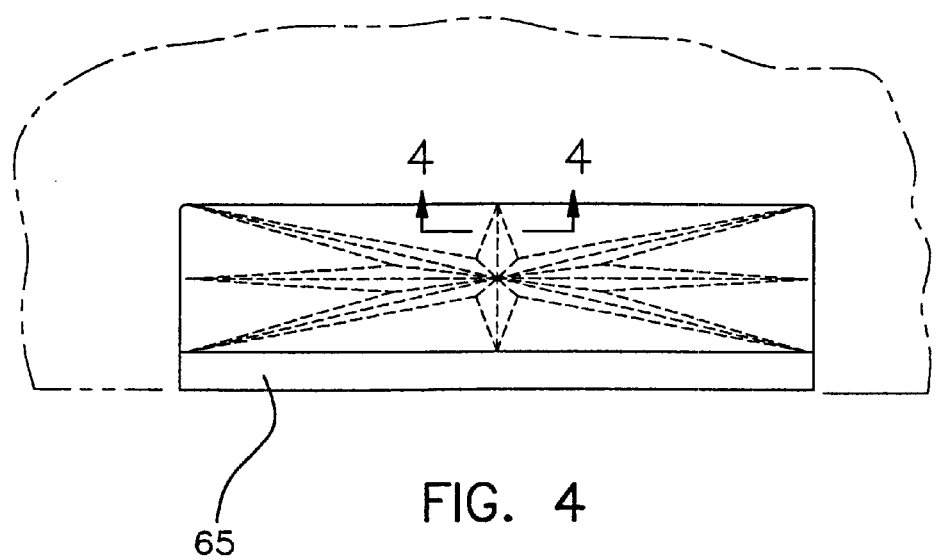
FIG. 4 is a schematic frontal view of the present invention showing a lens cover having a plurality of grooves extending therein in a star pattern.
Figure 5:
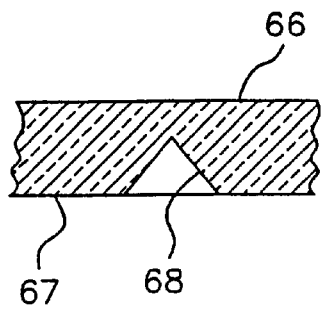
FIG. 5 is a schematic cross-sectional view of the present invention taken along line 4—4 of FIG. 4 and particularly showing the grooves extending into the lens cover.
Figure 6:
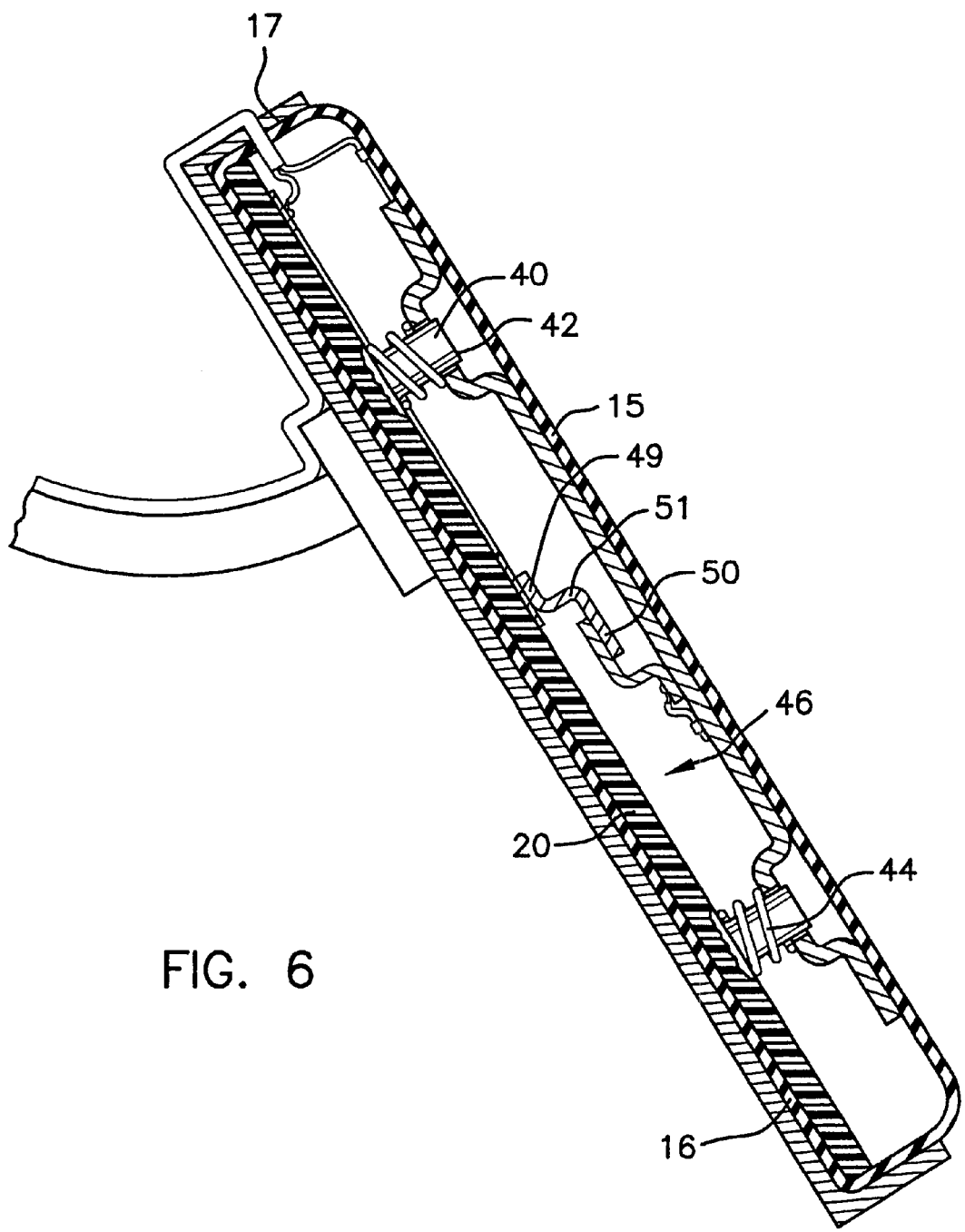
FIG. 6 is a schematic cross-sectional view of another embodiment of the present invention taken along line 2—2 of FIG. 1 and particularly showing an accelerator pedal pressure sensor integrally formed in an accelerator pedal to be installed in a new vehicle or replace an existing, conventional accelerator pedal.
Figure 7:
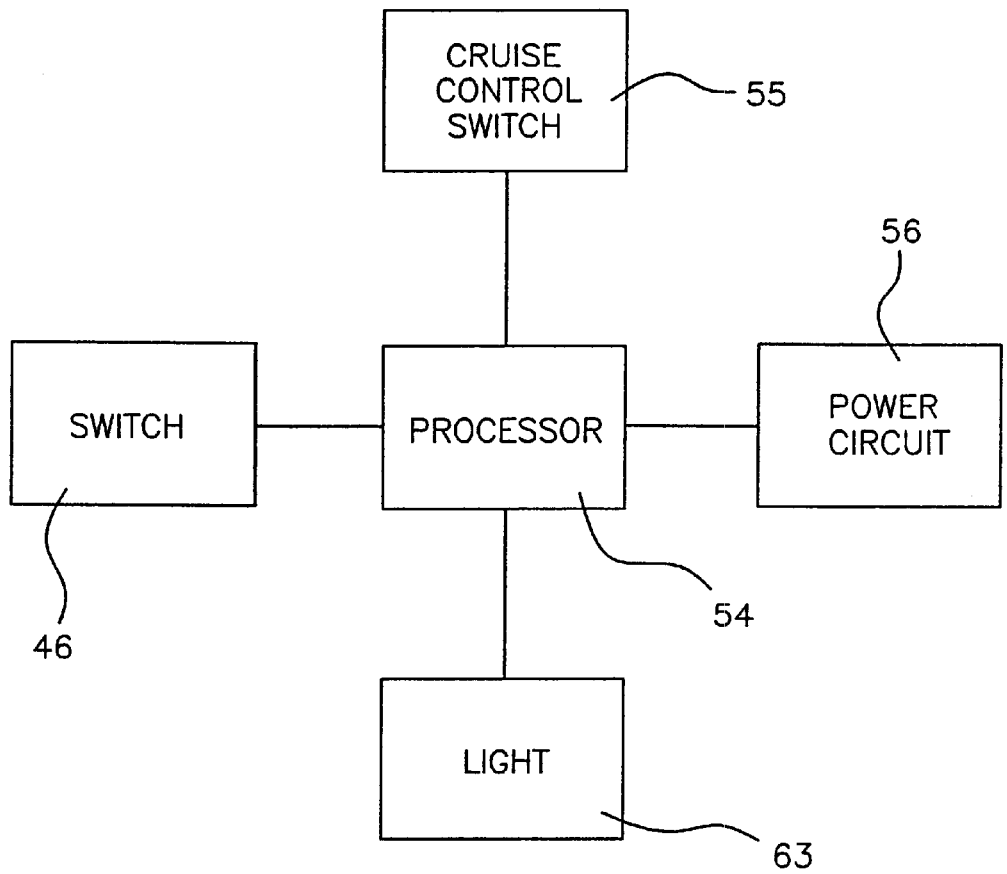
FIG. 7 is a schematic diagram of the present invention

As illustrated in FIGS. 2 and 5, a first plate 20 is mounted in the housing 14 and positioned adjacent to the bottom wall 16. The first plate 20 includes an upper surface 22 and a lower surface 24. The first plate 20 may comprise a substantially rigid material such as, for example, a metal or a plastic material.

A second plate 26 is mounted in the housing 14 adjacent to the top wall 15. The second plate 26 includes a first end 27 and a second end 28, a top surface 29 and a bottom surface 30. The second plate 26 also includes a pair of holes 32 formed therein. The second plate 26 additionally includes a pair of wells 34 extending therein. Each of the wells 34 may be positioned generally adjacent to one of the ends 27 and 28 of the second plate 26. A bottom portion of each of the wells has one of the holes 32 extending therethrough.

The second plate 26 may comprise a substantially rigid material such as, for example, a metal or plastic material.

A pair of rods 40 is positioned between the first and second plates 20 and 26. Each of the rods 40 is orientated generally perpendicular to the first plate 20 and attached to the upper surface 22 of the first plate 20. Each of the rods has a free end 42 that is movably positionable in one of the holes 32 of the second plate 26.

A biasing means 44 is provided for biasing the second plate 26 away from the first plate 20. The biasing means 44 is positioned on one of the rods 42. The biasing means 44 is positioned between the first and second plates 20 and 26. The biasing means 44 may comprise a coiled spring extending about one of the rods 40.

A switch 46 is provided for activating and deactivating the vehicular deceleration warning system 10. The switch 46 is positionable between an open and a closed position. In one embodiment, the open position is produced when pressure from a driver's foot is applied against the housing 14 causing the second plate 26 to move toward the first plate 20. In the same embodiment, the closed position is produced when pressure from a driver's foot is removed from the housing 14 causing the biasing means 44 to move the second plate 26 away from the first plate 20.

The switch 46 may comprise a pair of electrical contacts 48. Each of the electrical contacts 48 may be positioned in the housing 14. Each of the electrical contacts 48 includes a first portion 49 and a second portion 50. A third portion 51 is coupled to and extends between the first and second portions 49 and 50. The first portion 49 of a first one of the electrical contacts 48 may be mounted on the upper surface 22 of the first plate 20. A second one of the electrical contacts 48 may be mounted on a lower surface 30 of the second plate 26. The first portion 49 of each of the electrical contacts 48 may be orientated generally parallel to each other. The second portion 50 of each of the electrical contacts 48 is orientated generally parallel to each other. Each of the second portions 50 is designed to selectively abut against each other. In one embodiment, the second portions 50 are separated in the open condition of the switch 46 and abutted together in the closed condition of the switch 46.

A processor 54 is provided for determining when the switch 46 is in a closed condition. The processor 54 is connectable to a cruise control system having a cruise control switch 55. The processor 54 will disable the vehicular deceleration warning light system 10 if the cruise control switch 55 is in an ON position. The processor 54 is electrically connected to the power circuit 56.

A signaling means is provided for visually warning the following vehicle of the impending deceleration of the first vehicle. The signaling means may comprise a casing 59 that includes a back wall 60. A peripheral wall 61 is coupled to and extends away from the back wall 60 of the casing 59 such that an open front is defined. The casing 59 may be mountable in a rear window of the first vehicle. The casing may comprise a substantially rigid material such as, for example, a plastic material.

A light 63 is provided that is removably positionable in the casing 59 and is electrically coupled to the processor 54. The light 63 may comprise an automotive light bulb. A translucent lens 65 is provided that is removably couplable to the casing 59 such that the translucent lens 65 covers the open front of the casing 59. The translucent lens 65 includes a front surface 66 and a back surface 67. The back surface 67 has a plurality of grooves 68 extending therein. Each of the grooves 68 radiates outwardly from a center to form a star pattern. The lens cover 65 may comprise a substantially rigid material such as, for example, a plastic material.

In one embodiment, a securing means is provided for removably securing the housing 14 to an existing accelerator pedal. The securing means may comprise a pair of straps 70. Each of the straps 70 is attached to the housing 14. A free end 72 of each of the straps 70 is securable together in a loop around the accelerator pedal. Each of the straps 70 may comprise a resiliently flexible material such as, for example, a cloth or a plastic material.

In another embodiment, the accelerator pedal pressure sensor 12 may be incorporated into an accelerator pedal at the time of manufacturing. This embodiment would have all the same characteristics as a mountable embodiment except for the securing means.

In use, the signaling means is illuminated when a driver removes pressure from the accelerator pedal and causes the switch to close.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A vehicular deceleration warning light system for warning vehicles behind a first vehicle of impending deceleration of the first vehicle, the first vehicle having a power circuit and an accelerator pedal having a front and back surfaces, a peripheral edge extending between said front and back surfaces, wherein the pedal is operationally coupled to a motor, said system comprising:

an accelerator pedal pressure sensor for detecting removal of a driver's foot pressure from the accelerator pedal, said sensor comprising;

a housing having a top wall and a bottom wall, a peripheral wall extending between said top and bottom walls, said peripheral wall being coupled to said top and bottom walls, a lower surface of said bottom wall being mountable on said front surface of said accelerator pedal, said housing comprising a generally flexible material;

a first plate being mounted in said housing adjacent to said bottom wall, said first plate having an upper surface and a lower surface, said first plate comprising a substantially rigid material;

a second plate being mounted in said housing adjacent to said top wall, said second plate having a first end and a second end, a top surface and a bottom surface, said second plate having a pair of holes formed therein, said second plate having a pair of wells extending therein, each of said wells being positioned generally adjacent to one of said ends of said second plate, a bottom portion of each of said wells having one of said holes extending therethrough, said second plate comprising a substantially rigid material;

a pair of rods, each of said rods being positioned between said first and second plates, each of said rods being orientated generally perpendicular to said first plate, each of said rods being attached to said upper surface of said first plate, each of said rods having a free end, each of said free ends being movably positioned in one of said holes of said second plate;

a biasing means for biasing said second plate away from said first plate, said biasing means being positioned on one of said rods and positioned between said first and second plates, said biasing means comprising a coiled spring extending about one of said rods;

a switch for activating and deactivating said system, said switch being positionable between an open and a closed position, wherein said open position is produced when pressure from a driver's foot is applied against said housing causing said second plate to move toward said first plate, wherein said closed position is produced when pressure from a driver's foot is removed from said housing causing said biasing means to move said second plate away from said first plate, said switch comprising:

a pair of electrical contacts, each of said electrical contacts being positioned in said housing, each of said electrical contacts having a first portion and a second portion, a third portion being coupled to and extending between said first and second portions, said first portion of a first one of said electrical contacts being mounted on an upper surface of said first plate and a second one of said electrical contacts being mounted on a lower surface of said second plate, said first portion of each of said contacts being orientated generally parallel to each another, said second portion of each of said contacts being orientated generally parallel to each other, each of said second portions being adapted to selectively abut against each other, wherein said second portions are separated in said open condition of said switch and abutted together in said closed condition of said switch;

a processor for determining when said switch is closed, said processor being connectable to a cruise control system, having a cruise control switch, of the first vehicle disabling said vehicular deceleration warning light system if the cruise control switch is in an ON position, said processor being electrically connected to said power circuit;

a signaling means for visually warning the following vehicle of the impending deceleration of the first vehicle, said signaling means comprising;
   a casing having a back wall, a peripheral wall being coupled to and extending away from said back wall of said casing such that an open front is defined, said casing being mountable in a rear window of the first vehicle, said casing comprising a substantially rigid material;
   a light bulb being removably positioned in said casing and electrically coupled to said processor;
   a translucent lens being removably coupled to said casing such that said translucent lens covers said open front of said casing, said translucent lens having a front surface and a back surface, said back surface having a plurality of grooves extending therein, each of said grooves radiating outwardly from a center to form a star pattern, said lens cover comprising a substantially rigid material;

wherein said signaling means is illuminated when a driver removes pressure from the accelerator pedal and causes the switch to close.

\* \* \* \* \*